Oct. 19, 1954 J. D. COLE 2,691,886
STRESS RELAXATION MEASURING DEVICE
Filed Nov. 28, 1951 2 Sheets-Sheet 1

Inventor
James D. Cole
by Hans W. Hefter
Attorney

Oct. 19, 1954    J. D. COLE    2,691,886
STRESS RELAXATION MEASURING DEVICE
Filed Nov. 28, 1951    2 Sheets-Sheet 2

Inventor
James D. Cole
by Hans W. Hefler
Attorney.

Patented Oct. 19, 1954

2,691,886

UNITED STATES PATENT OFFICE 2,691,886

STRESS RELAXATION MEASURING DEVICE

James D. Cole, Park Ridge, Ill.

Application November 28, 1951, Serial No. 258,645

3 Claims. (Cl. 73—94)

The invention relates to a device for measuring the relaxation or fatigue in a gasket material under conditions similar to actual conditions to which the gasket material is subjected in practice.

The principal object of the invention is to provide means for measuring the stress relaxation of materials at substantially constant deflection.

The evaluation of this property of materials is especially useful in non-metallic gasket materials.

It is also an object of the invention to provide means for measuring stress relaxation under conditions as nearly simulating actual conditions of gasket application as possible. In most gasket applications the material is subjected to a relaxation which is not an absolute stress relaxation of the material, but a stress relation accompanied by a certain degree of creep or follow-up of the gasket caused by flanges, walls or the like which surround the gasket or by fastening means. While it is possible in an instrument for measuring stress relaxation to use external means to automatically compensate for this follow-up, it is believed that a basic device will be simpler if such compensation is either done manually or if not too significant, dispensed with.

Another object of the invention is the provision of a novel hydraulic pressure cell forming a part of the measuring device.

The invention consists in the several novel features hereinafter described with reference to the accompanying drawing and more particularly defined in the claims appended to this specification.

In a device intended to accomplish the objects of this invention, it is first of all necessary to provide a structure whose rigidity is such that its deflection under operating load changes is extremely small, and, furthermore, there should be provided a pressure indicating means whose deflection with load changes is very small. The rigidity of the structure is based on the fundamental relationship $$f = \frac{l \cdot P}{S \cdot E}$$

wherein $f$ equals the deflection in inches, $l$ is the length in inches, $P$ is the load in pounds, $S$ is the stressed area in square inches and $E$ is the modulus of elasticity. The desired rigidity of the structure is attained only by keeping the stress in the parts low, their length short and by using a material which has an elastic modulus as high as possible. In the pressure indicating portion of the device of the present invention a pressure cell of novel construction is employed. This cell or closed chamber permits pressure measurements directly with very small displacement.

Figure 1:
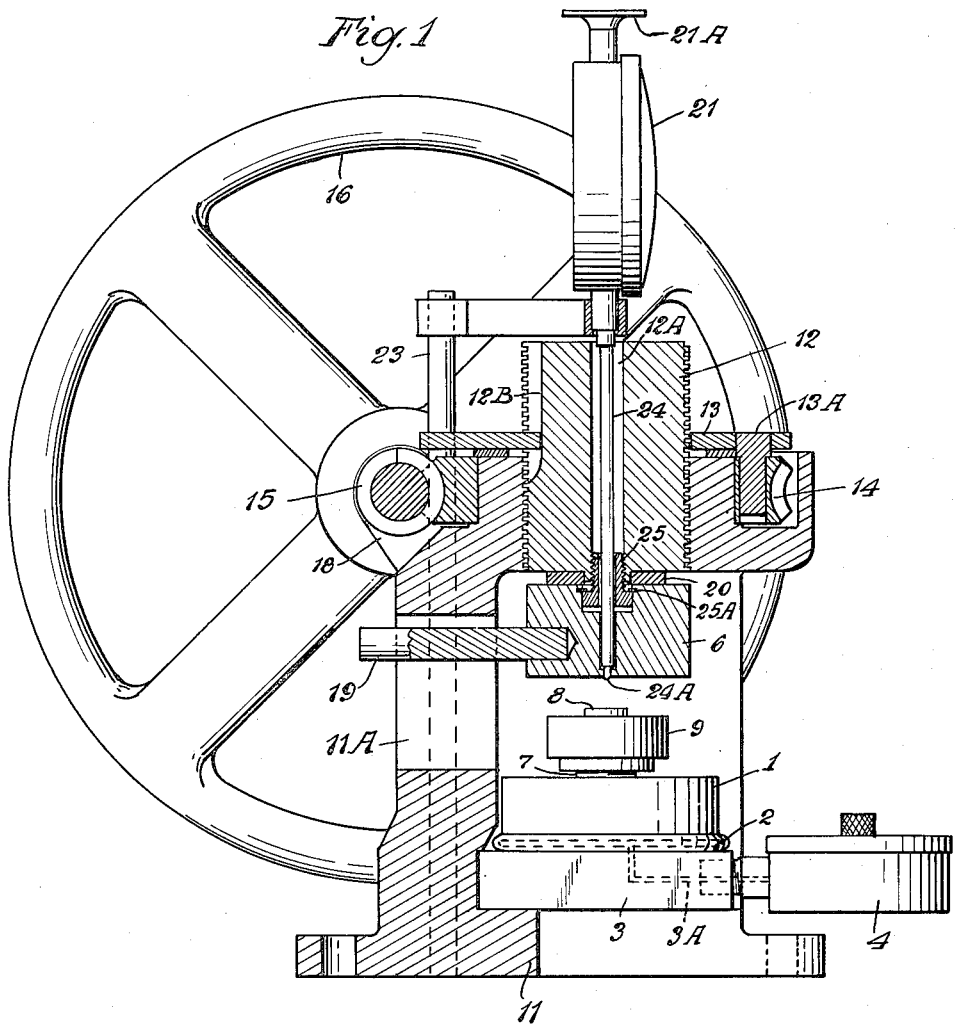
Figure 1 illustrates a vertical sectional view of the measuring device.
Figure 3:
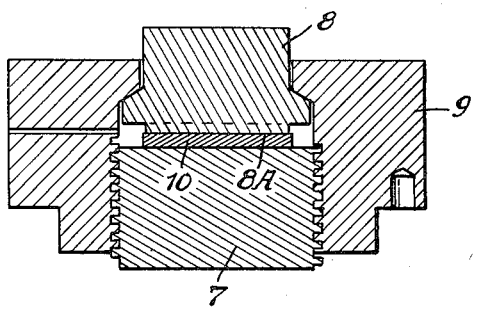
Figure 3 is a sectional view of the test capsule which may be employed for receiving the gasket material to be tested.
Figure 2:
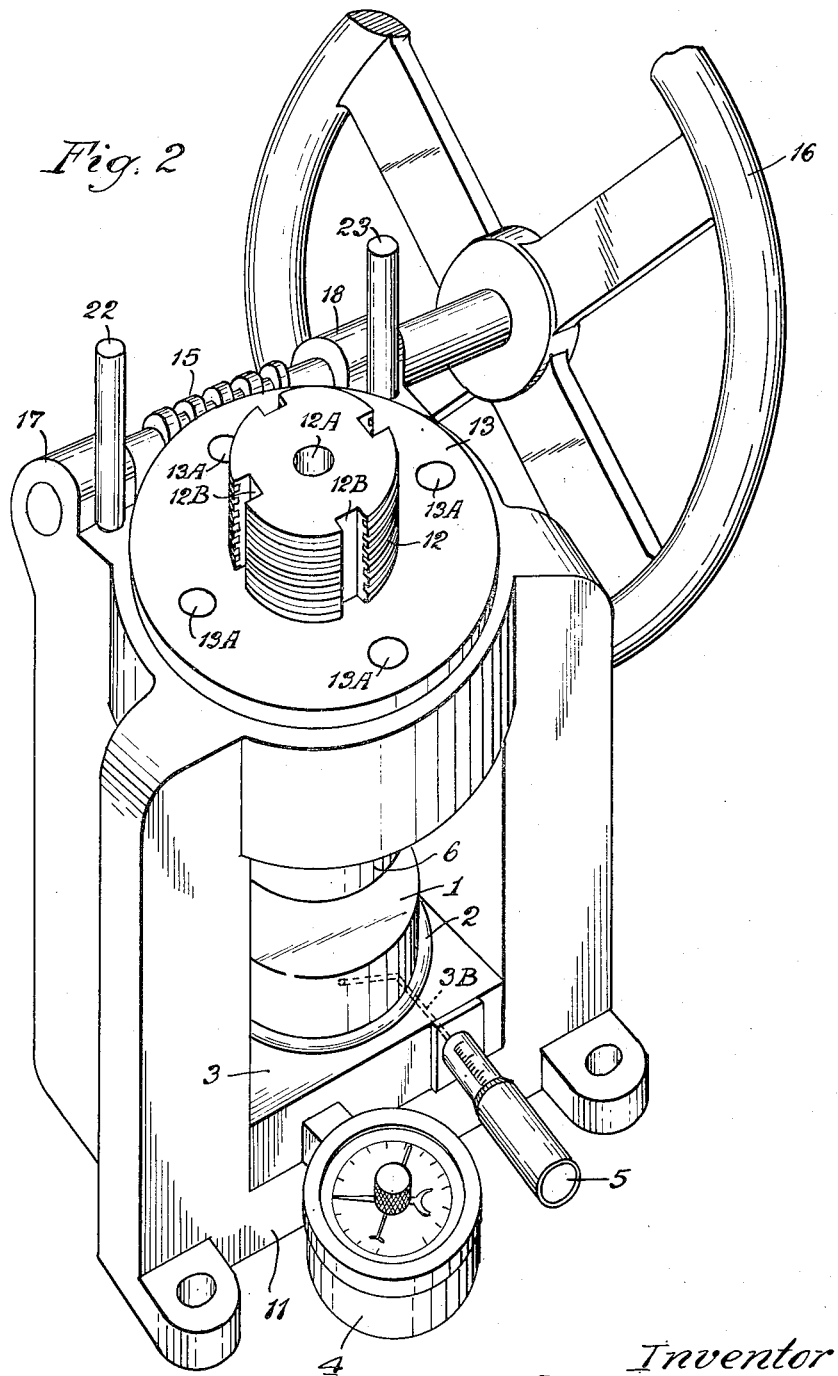
Figure 2 is a perspective view of the measuring device.

Referring to the drawings, the Figures 1 and 2 illustrate a screw press adapted to apply pressure to a gasket 10 placed in a test capsule, Figure 3, or placed directly between the piston 1 and the compression shoe 6. The test capsule is illustrated in Figure 3. It is composed of an annular member 9, a plunger 8 mounted in the central aperture of the member 9 and projecting therefrom and a plug 7 in threaded engagement with one end of the aperture in the annular member 9 and likewise projecting therefrom. The gasket 10 is compressed by a specific projected area 8A of the plunger 8.

The screw press consists of a cast frame 11 into which is threadedly mounted a jack screw 12. This jack screw is rotated by a circular plate 13 connected drivingly with the jack screw by splines 12B. The plate 13 is driven by an annular worm wheel 14 which is connected with said plate by means of one or preferably a plurality of pins 13A. The worm wheel 13 is rotated by a worm 15 which in the embodiment shown is driven by a hand wheel 16. The worm 15 is mounted with its shaft in bearings 17 and 18. A compression shoe 6 mounted at the lower end of the jack screw 12 is slidably connected with the frame 11 by a key 19 extending through a slot 11A in the frame so that when the jack screw 12 is rotated the compression shoe 6 moves in vertical direction within the frame without rotation. A suitable thrust bearing 20 is arranged between the compression shoe 6 and the lower end of the jack screw 12. The compression shoe 6 is connected to the jack screw by a screw 25 whose head is held in a counterbore of the compression shoe 6 by means of a lock ring 25A, as particularly shown in Figure 1. A dial indicator 21 is supported on the frame 11 by means of vertical rods 22 and 23 and extends with its measuring rod 24 through an axial bore 12A within the jack screw 12 and into axially aligned bores in the screw 25 and the compression shoe 6. The lowermost tip 24A of the measuring rod 24 is adapted to engage the test capsule (Fig. 3) which is placed in the screw press.

The screw press has mounted in its lower portion a hydraulic pressure cell or a closed chamber including two relatively inflexible metallic members having spaced parallel opposed faces and a flexible single convolution bellows between said two inflexible members. One of said metallic members is composed of a piston 1 having a relatively large diameter. The flexible bellows or diaphragm is indicated with 2, and the other inflexible member is formed by a base member 3 to which a Bourdon type pressure gage 4 is attached. A conduit 3A in the base member 3 connects the interior of the hydraulic chamber or the pressure cell with the gage 4. The entire hydraulic system is evacuated in any desired manner, for instance, by means of a vacuum pump before it is completely filled with a liquid of low thermal expansion characteristics. It is essential that the entire system be made free of entrapped air or gas. If any air or gas remains in the system, the cell will not only deflect excessively under compression but the cooling of the adiabaticly compressed air will yield erroneous pressure readings. The cell or chamber and the connecting conduit and the Bourdon tube in the gage will be filled completely with liquid. The deflection of the pressure cell will be due to compression of the liquid and to the stretching of the Bourdon tube owing to the increase in the volume of the latter and also the deflection will be due to elongation of the structural parts in accordance with the laws applying to the rest of the structure.

By providing a large projected area under the piston in relation to the volume change accompanying a change in pressure on the cell, the amount of movement of the piston with respect to its base can be kept small. In a device of the invention as tested a total deflection of the piston with respect to its base chamber for a pressure change of zero to 10,000 p. s. i. was only .0007 inch. A further reduction in movement could be attained by using a piston having a still larger cross-sectional area.

In using this device for testing gaskets having a thickness of $\frac{1}{16}$ and $\frac{1}{8}$ inch, respectively, the mentioned deflection of .0007 inch was not found to be of too much consequence on soft or medium hard materials. On hard materials, compensation for the deflection of the pressure cell and the mentioned structure was found to be of advantage particularly in such cases requiring extreme accuracy. In order to provide a means for compensating for the deflection, a micrometer screw 5 with a O ring seal may be provided as shown in the Figures 1 and 2. This micrometer screw 5 is brought into communication with the hydraulic chamber by means of a conduit 3B and can be advanced to force liquid back under the piston 1 to compensate for any undesirable deflection. This type of compensation when using a .250 diameter micrometer amounted in the example mentioned to about .006 inch per 1000 p. s. i. change. The micrometer screw 5 can also be used for compensating for changes in volume due to a change in the ambient temperature. This compensation amounted to .003 inch per degree centigrade.

In the operation of the measuring device, the gasket sample 10 is placed in the test capsule and the plug 7 is drawn up very lightly. The capsule is then placed on top of the piston 1. The hand wheel 16 then is advanced until the end of rod 24 contacts the top of the test cell. A preload is placed on top of the platform 21A. A reading of initial gasket thickness is thus arrived at. The jack screw is then advanced through a slight displacement corresponding to the amount the gage rod 24 protrudes below compression shoe 6. After this displacement the compression shoe 6 begins to move the plunger 8 downwardly to compress the gasket 10. During a defined compression time the screw is advanced to either a specific pressure reading or a specific per cent gasket compression based on thickness. At the end of the initial compressing time the thickness is read on the dial indicator 21 and the pressure is read on the gage 4. Gage readings are then taken at convenient time intervals during the relaxation period. After this initial relaxation period the annular member 9 of the test capsule is tightened until the dial of the pressure gauge indicates that the capsule has relieved the main compressing screw of its load. The capsule may then be removed and subjected to any tests that may be required to simulate gasket application. After suitable testing or conditioning the capsule is returned to the screw press. The screw is advanced to the identical dial indicator reading that was taken before removing the sample. The annular member 9 is loosened, compensations for temperature and pressure changes are made with the micrometer screw 5 in accordance with the calibration information. The pressure is then read as the relaxation pressure after conditioning.

If the inaccuracies due to the removal of the sample from the machine and inserting it back into the machine in the test capsule are to be eliminated, the complete testing may be run in the machine. The advantage of the use of a test capsule is that severe temperature, vibration or fluid pressure or immersion tests can be run on the capsule when it is not in the machine.

What I claim is:

1. In a device of the character described, a closed hydraulic system comprising means forming a closed chamber, said means including an upper and lower relatively inflexible metallic members having spaced parallel flat opposed faces and a flexible single convolution bellows having two parallel and closely spaced flat walls arranged between said upper and lower inflexible members, said flat opposed faces of said metallic members having an area at least as great as the top and bottom surface of the bellows which are in contact with said flat faces, a Bourdon type gage, conduit means connecting said closed chamber formed by said bellows with said gage, the interior of said chamber and conduit means being filled with a liquid which operates said gage when pressure is exerted upon a wall of said chamber, and manually operable means for clamping a gasket to be tested against one of said inflexible metallic members, and tending to compress said flexible single convolution bellows, said manually operable means including a screw jack.

2. A device as claimed in claim 1, including a pressure shoe carried by said screw jack and adapted to compress a gasket placed between said pressure shoe and said upper inflexible metallic member forming one wall of said closed chamber.

3. A device as claimed in claim 1, including a pressure shoe carried by said screw jack and a test capsule for receiving the gasket to be tested and adapted to be placed between said pressure shoe and the upper inflexible metallic member of said closed chamber.

References Cited in the file of this patent

UNITED STATES PATENTS

| Number | Name | Date |
|---|---|---|
| 1,027,300 | Wazau | May 21, 1912 |
| 1,458,920 | Troll | June 12, 1923 |
| 2,224,248 | Blum et al. | Dec. 10, 1940 |
| 2,269,969 | Branick | Jan. 13, 1942 |
| 2,311,762 | Kottmann et al. | Feb. 23, 1943 |
| 2,325,026 | Anway | July 27, 1943 |
| 2,482,147 | Bashore | Sept. 20, 1949 |
| 2,578,031 | Aubrey, Jr. | Dec. 11, 1951 |
| 2,639,613 | Richmond | May 26, 1953 |